Patented May 8, 1951

2,551,571

UNITED STATES PATENT OFFICE 2,551,571

METHOD OF PRODUCING SILANES

James B. Culbertson, Lockport, N. Y., assignor to Union Carbide and Carbon Corporation, a corporation of New York No Drawing. Application January 14, 1949, Serial No. 71,031

5 Claims. (Cl. 23—204)

The invention relates to silicon chemistry and more particularly to a method for producing silanes.

Silanes are a homologous series of silicon-hydrogen compounds of the type $Si_nH_{2n+2}$, or a derivative thereof. Due to the highly reactive characteristics of silanes, they form the basis for the synthesis of many organosilicon compounds. Despite a full recognition of their value, prior workers in the field of synthetic silicon chemistry have devised no satisfactory method for their production.

The problem of their production, however, has been the subject of intensive research for many years. Primarily, this former research has been related to three general methods of preparation based upon reactions between (1) silicide, water and acid; (2) silicide, alcohol and acid; and (3) silicide and ammonium bromide in liquid ammonia. Many metallic silicides, including the silicides of aluminum, manganese, magnesium, calcium and other metals, have been employed by prior workers in the above-mentioned reactions. Regardless of the silicide employed, the reactions have certain inherent adverse characteristics which prevent their satisfactory utilization in methods of production. For example, in the reaction between silicide and aqueous acid solutions, the silicide decomposes completely and rapidly; but only a few percent, maximum about 25 percent, of the contained silicon appears as silanes and less than 10 percent as monosilane ($SiH_4$). The larger part of the contained silicon of the silicide remains in the aqueous acid solution as a white solid consisting chiefly of prosiloxane $(SiH_2O)_x$, a polymerized silane decomposition product. In the reaction an unstable product ($SiH_2$) is formed which tends to polymerize and to react at all stages of polymerization with water to form prosiloxane, monosilane and higher silanes for example as shown in the equations below:

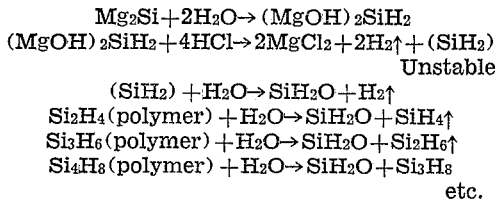

etc.

The higher silanes, $Si_2H_6$, $Si_3H_8$ etc., become less stable as the silicon content increases. Thus, as seen from the above equations, it has been impossible in aqueous acid reactions with silicide to obtain a sufficient yield of silanes and especially of the desired monosilane to render the process industrially attractive. It is also known that alcohol added to aqueous acid solutions increases the yield of silanes from silicides but the improved yields, so obtained, have been far too low to warrant industrial application of the process.

Previous workers have reported that magnesium silicide reacts with ammonium bromide in liquid ammonia to yield about three times the quantity of silanes (60-80% based on silicon content) that are obtainable by analogous aqueous methods. Due to the low temperatures required, ammonia contamination of the product and other difficulties, processes based upon this reaction apparently have attracted no commercial interest.

It is a primary object of the present invention to provide a method whereby high silane yields may be obtained in a simple and efficient process without the objections inherent in prior art processes.

It is a further object to provide a process whereby the silicon in the silicide may be substantially completely converted to silanes.

It is a still further object to provide a process for the preparation of silanes wherein a by-product is a pure metal halide of commercial value.

According to the method of the invention, a comminuted metal silicide is added to or suspended in an anhydrous neutral solvent for a halogen acid and, while suspended or otherwise in contact with said anhydrous neutral solvent, the comminuted metal silicide is reacted with a halogen acid to yield silanes. Due to the high reactivity of silanes, the gas should be collected in an air-free chamber.

Among solvents for halogen acids suitable for use in the method of the invention are ethyl silicate, methyl silicate and other organic esters. The solvent should be anhydrous to avoid objectionable aqueous acid reaction with the silicide. The solvent likewise should be inert or neutral to the reaction serving only as a carrier for the halogen acid and as a suspending medium for the comminuted metal silicide.

Any metal silicide which reacts with a halogen acid is suitable for use in the method of the invention. Silicides of light metals, that is metals having atomic weights of less than 138, for example, calcium, aluminum, sodium and lithium are recommended. Magnesium silicide ($Mg_2Si$) is a preferred silicide. One known method of preparing magnesium silicide in a particularly reactive form comprises mixing comminuted magnesium and silicon in the correct proportion to form the compound i. e. two moles of magnesium to one of silicon, and heating the mixture so formed in a neutral or reducing atmosphere at 500° C. for a time sufficient to form the silicide by solid phase reaction.

Halogen acids are recommended for use in the method of the invention. Hydrochloric acid is preferred. It is known that nitric and other oxidizing acids are not suitable. Sulphuric acid is objectionable in that it tends to destroy many organic solvents.

In its preferred form the invention comprises introducing comminuted magnesium silicide ($Mg_2Si$) into ethyl silicate in a suitable reaction vessel; removing the air from said vessel in any suitable manner as by replacement with an inert atmosphere such as argon; introducing hydrogen chloride gas into said ethyl silicate to react with the magnesium silicide therein, and collecting the evolved silanes. The reaction proceeds quietly beginning at room temperature and continues by an exothermic reaction until the contained silicon in the magnesium silicide is completely converted to silanes. Anhydrous magnesium chloride is formed as a by-product and may be separated from the ethyl silicate by simple filtration or otherwise. The ethyl silicate remains substantially unaltered by the reaction and may be reused as often as desired. The basic reaction proceeds as follows:

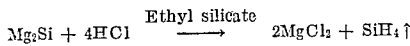

Reactions which produce silanes other than monosilane may take place depending upon physical conditions under which the reaction is performed. For example:

$$2Mg_2Si + 8HCl \rightarrow Si_2H_6\uparrow + H_2\uparrow + 4MgCl_2$$
$$3Mg_2Si + 12HCl \rightarrow Si_3H_8 + 2H_2\uparrow + 6MgCl_2$$

Since magnesium is divalent and silicon tetravalent, the compound $Mg_2Si$ reacts with hydrochloric acid preferentially to form monosilane, the preferred silane. Although the product of the method of the invention is chiefly monosilane, the yield based upon silicon conversion is dependent upon the silicide employed. For example, silicides of calcium wherein the major compound contains two moles of silicon per mole of calcium, the maximum silane yield based upon silicon conversion is 25% as shown in the equations below:

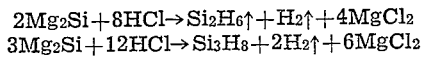

What is claimed is:

1. Method for the preparation of silanes, which comprises introducing a comminuted metal silicide into an inert solvent for a halogen acid, contacting said metal silicides, while in said inert solvent, with a dry halogen acid gas, and collecting the evolved silanes.

2. Method as claimed in claim 1 wherein the anhydrous metal chloride formed in the reaction between said dry halogen acid gas and said metal silicide is removed from said inert solvent.

3. Method for the preparation of silanes, which comprises introducing into a reaction vessel a comminuted metal silicide and an inert solvent for a halogen acid; removing air from said vessel; passing a dry halogen acid gas into said inert solvent for reaction with said metal silicide; and collecting the evolved silanes in the absence of air.

4. Method for the preparation of silanes, which comprises introducing into a reaction vessel ethyl silicate and comminuted magnesium silicide; removing air from said vessel; passing dry hydrochloric acid gas into said ethyl silicate and into contact with said magnesium silicide; and collecting the evolved silanes in the absence of air.

5. Method as claimed in claim 4 wherein the anhydrous magnesium chloride formed in the reaction between said magnesium silicide and said dry hydrochloric acid gas is removed from said ethyl silicate.

JAMES B. CULBERTSON.

REFERENCES CITED

The following references are of record in the file of this patent:

Schwartz: "Ber. der Deu. Chem.," vol. 55, pages 3242–52, 1922.

Schwarz et al.: Chem. Abst., vol. 17, pages 1932–3, 1923.

Schwarz et al.: Chem. Abst., vol. 19, pages 1670–71, 1925.

Hackh's Chemical Dictionary, 1938 edition.